United States Patent [19]

McCullough

[11] 4,063,332

[45] Dec. 20, 1977

[54] FISH-SKINNING TOOL

[76] Inventor: Timothy J. McCullough, West Lake, Vermilion, Ohio 44089

[21] Appl. No.: 668,130

[22] Filed: Mar. 18, 1976

[51] Int. Cl.² ............................................. A22C 25/17
[52] U.S. Cl. ......................................... 17/62; 17/21; 17/67
[58] Field of Search ................... 17/21, 62, 67, 68, 69, 17/66; 30/276

[56] References Cited

U.S. PATENT DOCUMENTS

| | | | |
|---|---|---|---|
| 1,235,085 | 7/1917 | Weinberg | 17/67 |
| 1,642,802 | 9/1927 | Barry | 17/67 |
| 1,758,675 | 5/1930 | Reilly | 17/67 |
| 1,982,083 | 11/1934 | Strand | 17/67 |
| 2,154,187 | 4/1939 | Scoville | 17/67 |
| 2,557,272 | 6/1951 | Gabriel | 17/67 |
| 2,720,002 | 10/1955 | Waters | 17/67 |
| 2,835,919 | 5/1958 | Colburn et al. | 17/67 |
| 3,128,550 | 4/1964 | Miselli | 30/276 X |
| 3,491,819 | 1/1970 | Sawrenko | 30/276 |
| 3,852,882 | 12/1974 | Bettcher | 30/276 |

FOREIGN PATENT DOCUMENTS

| | | | |
|---|---|---|---|
| 478,227 | 11/1951 | Canada | 17/67 |
| 384,166 | 10/1960 | Switzerland | 17/67 |

*Primary Examiner*—Louis G. Mancene
*Assistant Examiner*—Paul J. Hirsch

[57] ABSTRACT

A hand tool for skinning fish. The tool has plural laminar blades mounted generally longitudinally in a cylindrical blade mandrel. The mandrel is demountably affixed to a drive means, preferably an air motor in a handle which is aligned with the axis of rotation of the blade mandrel. A guide shoe is provided with a central opening through which the cutting edges of the blades protrude to a preselected depth. A guard with a chute is also provided; the guard simultaneously provides protection against the rotating blades and funnels skin to the chute through which the skin is discharged.

6 Claims, 8 Drawing Figures

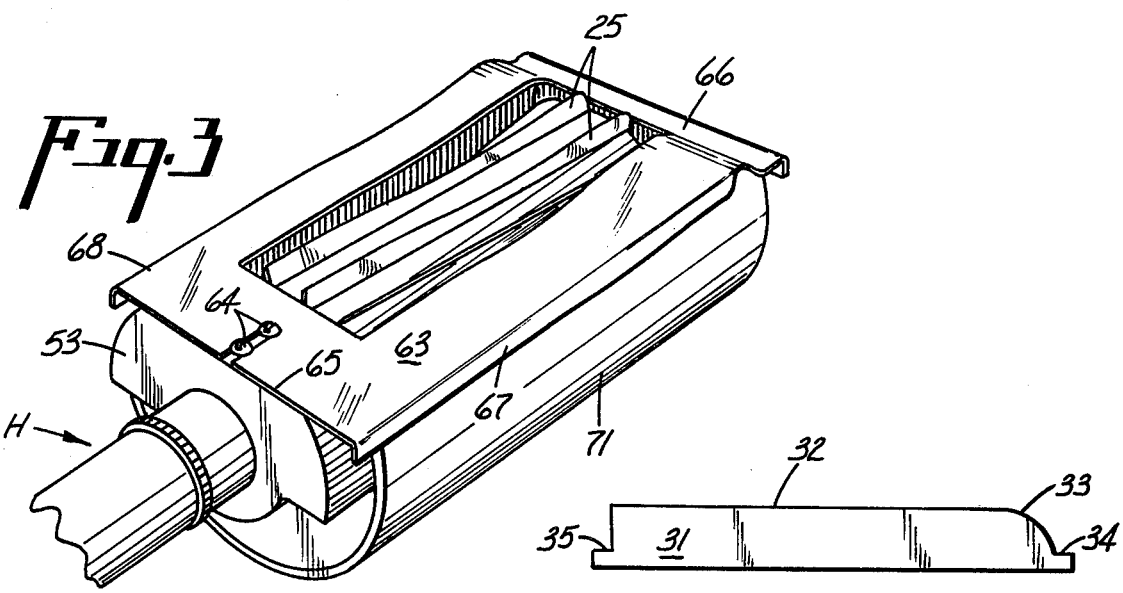
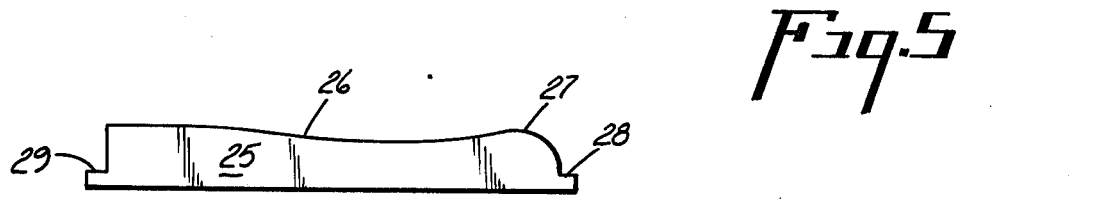
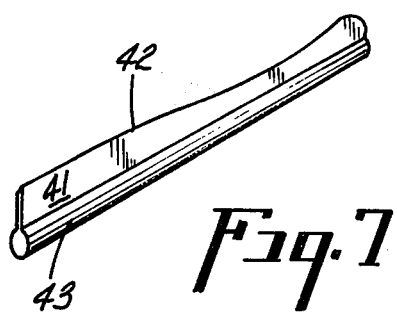
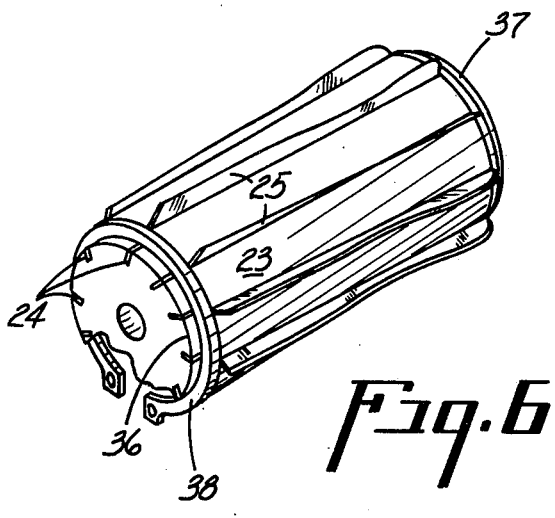
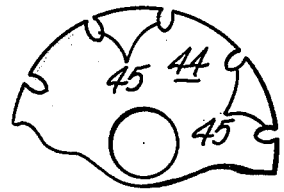

FISH-SKINNING TOOL

BACKGROUND OF THE INVENTION

A large segment of the commercial fishing interests scattered throughout the world is committed to canning relatively large fish. These fish are cooked before they are canned, and are generally ready to eat from the can. Popular fish which are thus canned include tuna, skipjack, albacore and salmon. Since these fish are procured at no small expense, and much labor is necessary to provide the finished product for sale, there has developed a need to minimize both the waste of salable product and the time and energy required to process the fish. Efficient skinning of these fish helps minimize both. However, current methods of skinning by hand with a conventional straight knife permits no practical means to control yield, which is the ratio of salable fish meat to waste skin. The fish-skinning tool of this invention is not directed to descaling fish, but skinning it, and provides a convenient and practical means to control yield.

SUMMARY OF THE INVENTION

It is a general object of this invention to provide a novel and improved hand-held fish skinning tool having a power driven cylindrical blade mandrel with cooperating guide shoe and guard. The fish skinning tool is particularly suitable for use in skinning large, cooked fish such as are processed by commercial fisheries.

It is also a general object of this invention to provide a fish skinning tool having a drive means removably affixed to a cutting unit which may be disassembled for cleaning and reassembled without specialized tools. The cutting unit may be affixed to an air motor drive means or to a flexible cable driven by a remote electric motor so that the tool may be handled with wet hands or dropped in water with minimum risk of electric shock.

It is a specific object of this invention to provide a fish skinning tool which is light in weight, has proper balance, may be used for any type of skinning operation involving the removal of a predetermined layer of material, allows itself to be used for either a left-handed or right-handed operator with a change of blade mandrel, provides the operator freedom of movement over a large area, and provides safe and precise control over the starting and stopping of rotation of the blade mandrel.

It is also a specific object of this invention to provide a fish skinning tool which is provided with a guide shoe adapted to embrace and fit contours of any particular fish so as to skin the fish uniformly.

It is a further specific object of this invention to provide a fish skinning tool with a guard which closely surrounds a major portion of the blade mandrel in such a way that skin cut by blades in the mandrel is directed to a chute in the guard, through which chute the skin is discharged.

It is yet another specific object of this invention to provide a fish skinning tool with a cutting unit driven by an air motor housed in a handle which is aligned with the axis of rotation of the blade mandrel, which air motor is provided with air supply and exhaust conduits; a seal gland interposed between the air motor and cutting unit, precludes leakage of oil and contaminants in the air supply to the cutting unit and thence to the work being skinned, or leakage of body fluids from the fish or sterilizing solutions into the air motor.

Further objects and advantages of the fish skinning tool will be hereinafter referred to, and/or be apparent from the following description of preferred embodiments.

BRIEF DESCRIPTION OF THE DRAWINGS

FIG. 3 is a perspective view of the cutting unit shown in FIG. 1 rotated at 180°.

FIG. 4 is an elevational view of one embodiment of a contoured blade.

FIG. 5 is an elevational view of another embodiment of a contoured blade.

FIG. 6 is an elevational perspective view, with a part broken away, of the blade mount with blades held in with snap-rings.

FIG. 7 is a perspective view of a blade molded into a nylon carrier.

FIG. 8 is an elevational end view with, with part broken away, diagramatically illustrating a slotted blade mount adapted to receive a molded blade as shown in FIG. 7.

DESCRIPTION OF PREFERRED EMBODIMENTS OF THE INVENTION

Figure 1:
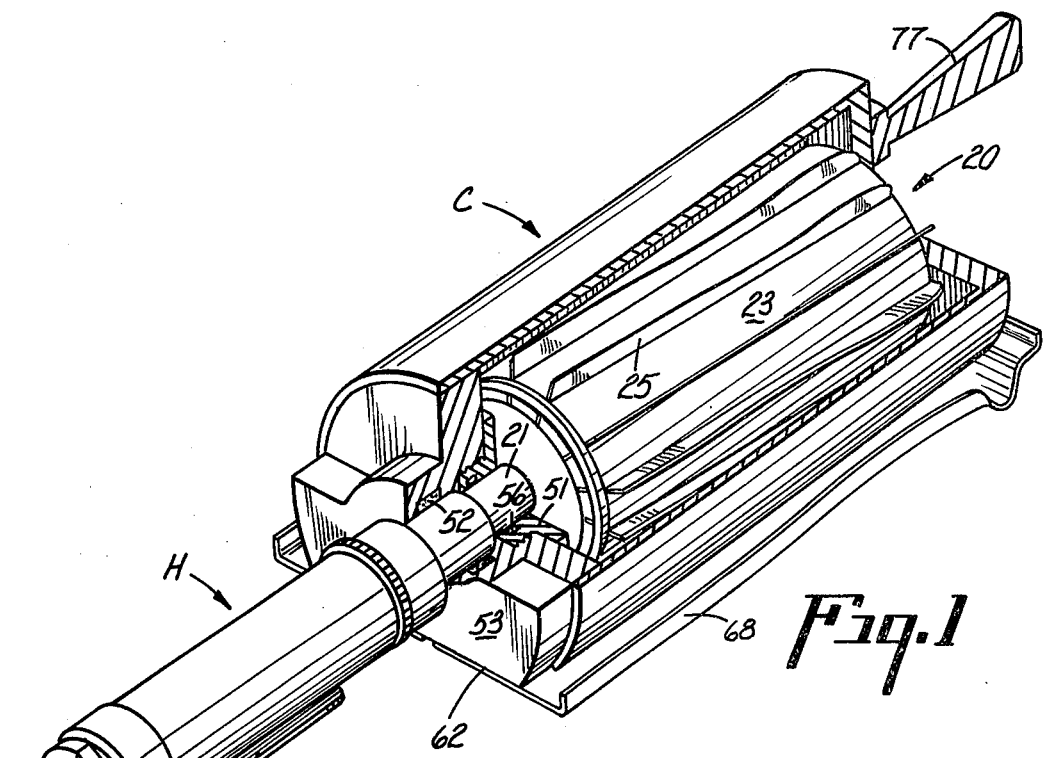
FIG. 1 is a perspective view of an embodiment, partly in section, with parts broken away, of the fish skinning tool of this invention in which an air motor is the drive means for a cutting unit.

Various types of power driven cutting knives and skinning tools have been developed with particular cutting characteristics and structural features directed to a specific application for which the tool is designed. The fish-skinning tool of this invention is designed for removing laminar pieces of skin from the surface of a fish by cutting small pieces of skin as the tool is worked over the body of the fish to be skinned. As illustrated in FIG. 1 of the drawings there is shown a tool of this invention which comprises a cutting unit designated generally by the reference character C which is removably attached to a drive means housed in a handle assembly designated generally by the reference character H.

The handle assembly H may house an air motor of conventional design such as is described in U.S. Pat. No. 3,852,882 to Louis A. Bettcher, the description of which is incorporated herein by reference as if fully forth herein. Air is supplied to the air motor through a supply conduit 11, and exhausted from the air motor through exhaust conduit 12. The flow of air to the air motor is controlled by a conventional valve assembly, manually operable by a control lever 13. The air motor has an output shaft (not shown), preferably having a square cross section, which provides power for a blade mandrel designated generally by reference numeral 20 in the cutting unit C.

Instead of housing an air motor, the handle H may house a flexible drive cable driven by a remote electric motor, preferably mounted overhead, such as is conventionally done to minimize the possibility of electric shock when an electric motor drive means is desired. The electric motor may be started and stopped by a foot-operated hermetically sealed switch such as is conventionally employed under similar conditions.

Figure 2:
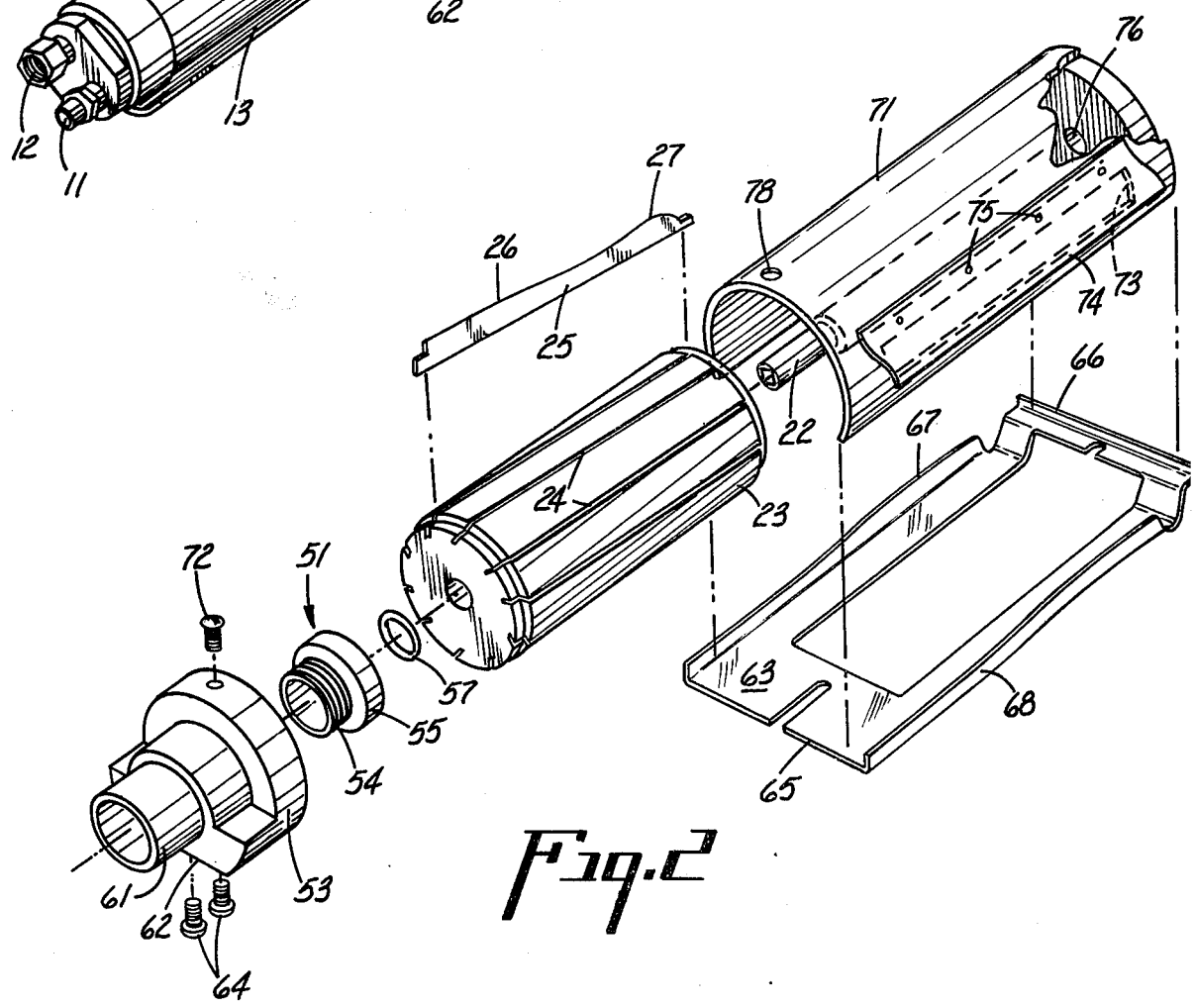
FIG. 2 is an exploded perspective view of the cutting unit shown in FIG. 1.

Referring now to FIGS. 1 and 2 it will be seen that the cutting unit C comprises the blade mandrel 20 fixedly disposed on a mandrel drive 21. One end of the mandrel drive shaft 21 is supported for rotation in a main head 53 which is part of the cutting unit C. The mandrel drive shaft 21 is stepped down in diameter at one end to provide a mandrel pilot shaft 22 having an axial opening of rectangular cross-section dimensioned to accomodate snugly the rectangular output shaft of the drive means housed in handle H.

The blade mandrel 20 comprises a right cylindrical blade mount 23 having an axial longitudinal passage in which the mandrel drive shaft 21 is interference fitted. The material for the blade mount may be any suitable material such as stainless steel or a synthetic resinous material such as nylon. To decrease the weight of the blade mount, it may be hollow. The cylindrical surface of the blade mount is provided with a plurality of slots 24 cut generally longitudinally therein, but preferably at a slight angle to the longitudinal axis of the blade mount. The depth and width of each slot 24 is such as to snugly accomodate a radially outwardly directed laminar blade 25 which is removably inserted therein. It is essential that at least three, and preferably from about six to about 20 blades, each with a cutting edge 26, be inserted in a blade mount, depending upon the size of the fish to be cleaned and the characteristics of the skin to be removed. The plural blades thus mounted present, in operation, a succession of rapidly rotating cutting edges. To enable an operator to remove skin from a large area in a single pass, it is preferred that the cutting edge 26 of each blade be contoured to comform to the body of the fish being skinned. By changing the angle at which the tool is held, the segment of the cutting edge of the blade in contact with the body may be changed, thus changing the contour of the cut.

Referring now to FIG. 4 there is shown one embodiment of a blade in which the cutting edge 26 is generally arcuate and terminates in a curved segment 27. The blade 25 is stepped down at each end 28 and 29 respectively which ends do not have cutting edges but which enable the blade to be removably held in the blade mount 23 as will be explained hereinafter.

Referring now to FIG. 5 there is shown another embodiment of a blade 31 in which the cutting edge 32 is generally linear over a major portion and then curves as shown at the segment 33. The blade 31 is stepped down at each end 34 and 35 respectively, which ends serve to hold the blade in the mount.

As seen in FIG. 6, there is diagrammatically illustrated a plurality of blades 25 mounted in a blade mount 23 provided with slots 24 in which blades are inserted. The blade mount 23 is annularly stepped down at each end to provide shoulders 36 and 37 respectively, on which retainer snap-rings 38 are fitted to secure ends 28 and 29 in the shoulders of the blade mount.

The use of snap rings to secure the blades may be avoided in an embodiment of a molded blade illustrated in FIG. 7 wherein a blade 41 having a cutting edge 42 has a nylon carrier 43 molded onto the lower portion of the blade. This is effected in a known manner so that the blade is fixedly secured in the carrier 43 and cannot be loosened therein. The carrier is preferably formed with a surface of relatively large radii and no internal sharp corners to permit easy sanitary cleaning and also to facilitate insertion and removal of the molded blades into a cooperating blade mount 44, shown in end view in FIG. 8, which is provided with grooves 45 molded circumferentially along the length of the blade mount 44. Each groove 45 tightly accomodates the carrier 43 and presents the cutting edge 42 of the blade at a desired angle.

Irrespective of the particular embodiment of blade mount and cooperating blades used, it is essential that the cutting edges of the blades be set so they cut efficiently and without clogging or loading up with the material cut. It is preferred to set the blades with from about 10°–20° of lead, the most preferred being about 15°, and with from about 50°–70° of rake or relief on the rear side, the most preferred being about 60°. In addition, as has been indicated, the blades are mounted at a slight angle to the centerline of the mandrel, this angle being in the range from about 2°–10°, and more preferably about 5°.

Reverting now to FIGS. 1 and 2, it is seen that the blade mandrel 20 is supported for rotational movement in a seal gland 51 and a bearing 52 both of which are supported axially in a main head 53. The seal gland 51 is preferably molded from a high density synthetic resinous material such as polypropylene, high density polyethylene, nylon and the like, such as are commonly used for molding, and comprises a short cylindrical section 54 having a radially outwardly extending flange 55. The sealing gland is provided with an axial bore which snugly accomodates the mandrel drive shaft 21. There is provided in the wall of the axial bore an annular groove 56 in which as elastomer O-ring 57 is inserted. The O-ring provides a seal for the mandrel drive shaft and prevents leakage of oil and other contaminants from the main head 53 into the cutting zone of the blade mandrel.

This embodiment of a seal is particularly adapted for keeping out contaminants in the air supply of any pneumatic tool utilizing a demountable cutting or dressing unit for comestible goods. It is surprisingly effective because of the precise seal afforded by a quality O-ring, such as one made from a silicone type elastomer, a fluorocarbon elastomer, or high-grade neoprene rubber. The O-ring is easily inspected visually when the blade mandrel 20 is removed from the main head 53, and a worn O-ring is easily replaced. Moreover, particularly when the body of the sealing gland 51 is made from a nylon, polypropylene or similar material, the gland 51 may be frequently removed from the main head 53 in which it is mounted, and sterilized. It should also be noted that the sealing gland 51 seals the bearing 52 from dirt. Thus, even where a motor-driven flexible drive cable is used, and there is no problem of contamination from an air supply, it may still be desirable to use the seal gland 51.

The main head 53 comprises a generally cylindrical stepped member having a hub 61 provided with an axial threaded bore in which the handle H is threaddedly disposed. The lower portion of the main head 53 is generally planar and provides a base 62 against which a guide shoe 63 is demountably secured with machine screws 64 or other fastening means.

The guide shoe 63 rests on the body of the fish to be skinned, and is a generally planar member, as illustrated in FIGS. 2 and 3, provided with a generally rectangular central opening through which the cutting edges of the blades protrude. The guide shoe is secured near its rear edge 65 to the base 62 of the main head 53. Near the forward edge 66, the guide shoe is arcuate to facilitate skinning of particular portions of the body of a fish. It will be evident that the guide shoe 63 will be preferably shaped to follow the contour of the particular type of fish to be skinned, and also that it will be positioned in such a manner that, with the guide shoe resting on the body of the fish, the optimum thickness of skin is removed. The sides 67 and 68 are turned upward from the body of a fish to be skinned so that the side edges of the guide shoe do not dig into the fish. Near its forward edge 66 the guide shoe is fastened to a guard 71 which encloses the blade mandrel above the guide shoe 63. The guard 71 is fastened to the front portion of the main head 53 with a machine screw 72, inserted through aperture 78 in the guard, that portion of the surface of the main head under the guard being thus sealed by the inner surface of the guard, so that cut skin will not be discharged around the main head. The guard 71 is provided with a slot or chute 73 and a vane 74 thereabove to direct the discharge of cut skin from the chute. The vane 74 may be formed from a thin piece of laminar stainless steel, bent to give it the desired shape, and fastened to the guard 71, with rivets 75.

The forward end of the guard 71, namely the end oppositlely disposed from the main head 53, is closed except for a passage 76 in which the forward end of the mandrel drive shaft is journaled for rotation. The guard 71, in cooperation with the guide shoe 63 beneath it, and the main head 53, thus forms a confined zone in which the blades 25 rotate. The guard 72 simultaneously thus protects the operator from danger while using the tool on a fish, and also provides a zone through which cut skin is funneled and then discharged through the chute 73. It is preferred to provide an auxiliary handle means 77 on the closed end of the guard 71 to help an operator guide the blades during skinning, and to facilitate holding the guide shoe 63 against the body of a fish to be skinned in the less easily accessible portions of its body. The shape of the handle and its size are not critical. It is sufficient that the handle 77 permits the operator's free hand to grasp it and guide the tool, thus to aid the other hand in which the handle H is grasped. Typically, the handle 77 is simply an elongated stub, preferably tapered, formed from a suitable corrosion-resistant metal or resinous material such as nylon, which handle is attached to the closed end of the guard 71.

The tool of this invention is particularly effective for skinning cooked fish, and as explained hereinabove, the guide shoe 63 and blades 25 may be contoured for a particular species and size of fish being skinned. In the preferred embodiment where an air motor means is used, the exhaust is ducted away from the tool and is not discharged in the immediate vicinity of the operator. The operator will normally use the tool is such a manner that the optimum thickness of superficial material is removed and discharged from the chute 73, away from the operator. The tool is turned off by simply releasing the pressure on the control lever 13, and reduces both the chances of accidents and the consumption of air.

From the foregoing description of the preferred embodiments it will be apparent that the objects of the invention heretofore enumerated, and other, have been accomplished, and that there has been provided skinning tools of the character referred to which are light in weight, convenient to operate, and which allow maximization of yield for better profits.

Modifications, changes and improvements to the preferred form of the invention herein disclosed, described and exemplified may occur to those skilled in the art who come to understand the principles and precepts thereof. Accordingly the scope of the patent to be issued herein should not be limited to the particular embodiments of the invention set forth herein, but rather sould be limited by the advance of which the invention has promoted the art.

Having thus described my invention, I claim:

1. A hand-manipulated tool for skinning a fish body or the like comprising a blade-supporting cutting unit and an elongated handle assembly projecting from one side thereof, said cutting unit comprising a blade mandrel having a mandrel drive shaft rotatably supported for rotation about its longitudinal axis, said blade mandrel having removably secured therein a plurality of radially outwardly projecting continuous, linear knife blades each presenting a sharp cutting edge which terminates in a curved segment so as to function as a skinning blade, each said blade being offset from 2° to about 10° from said longitudinal axis, and having from about 10°–20° lead and 50°–70° rake, so that said sharp cutting edges when rotated, define a generally cylindrical cutting zone in which skin is cut away from flesh, a guide shoe removably disposed under said blade mandrel said guide shoe having an opening through which said sharp cutting edges adjustably protrude to cut skin away from flesh, said guide shoe having a generally planar surface for contact with said body, a guard enclosing said blade mandrel, said guard cooperating with said guide shoe to provide a confined zone from which cut skin may be discharged, and drive means for rotating said blade mandrel.

2. The hand-manipulated tool of claim 1 wherein said mandrel drive shaft is supported at one end in a main head, said guard is removably disposed upon said main head, and, said mandrel drive shaft is supported at its other end by said guard.

3. The hand-manipulated tool of claim 3 wherein said main head includes a bearing means, in which said one end of said mandrel drive shaft is rotatably supported, and a seal gland means disposed intermediate said bearing means and said blade mount, said seal gland means having circumferentially secured therein O-ring means to seal said blade mount from contaminants to which said bearing means are exposed.

4. The hand-manipulated tool of claim 1 wherein said cutting unit is demountably disposed on said elongated handle assembly.

5. The hand-manipulated tool of claim 1 wherein said drive means for rotating said mandrel drive shaft is an air motor.

6. The hand-manipulated tool of claim 1 wherein said blade mandrel includes a mandrel drive shaft rotatably supported for rotation about its longitudinal axis, and a blade mount having a longitudinal axial bore in which said mandrel drive shaft is tightly fitted to prevent relative rotational movement therebetween.

* * * * *